US012269090B2

(12) United States Patent
Ray Majumder et al.

(10) Patent No.: US 12,269,090 B2
(45) Date of Patent: Apr. 8, 2025

(54) SYSTEM AND METHOD FOR ADDITIVE MANUFACTURING CONTROL

(71) Applicant: General Electric Company, Schenectady, NY (US)

(72) Inventors: Saikat K. Ray Majumder, Niskayuna, NY (US); Naresh S. Iyer, Schenectady, NY (US); Xiaohu Ping, Clifton Park, NY (US); Subhrajit Roychowdhury, Schenectady, NY (US)

(73) Assignee: General Electric Company, Evendale, OH (US)

( * ) Notice: Subject to any disclaimer, the term of this patent is extended or adjusted under 35 U.S.C. 154(b) by 912 days.

(21) Appl. No.: 17/398,604

(22) Filed: Aug. 10, 2021

(65) Prior Publication Data

US 2023/0046049 A1 Feb. 16, 2023

(51) Int. Cl.
*B29C 64/00* (2017.01)
*B22F 10/28* (2021.01)
(Continued)

(52) U.S. Cl.
CPC .............. *B22F 10/28* (2021.01); *B29C 64/00* (2017.08); *B29C 64/10* (2017.08); *B33Y 10/00* (2014.12); *B33Y 50/02* (2014.12); *G06N 3/088* (2013.01); *G06T 7/97* (2017.01); *B29C 2037/903* (2013.01); *B29C 2049/78805* (2022.05);
(Continued)

(58) Field of Classification Search
CPC .......... B22F 10/28; B22F 10/20; B22F 10/36; B22F 10/85; B22F 2999/00; B22F 10/80; B22F 12/90; B29C 64/00; B29C 64/10; B29C 2037/903; B29C 2049/78805; B33Y 10/00; B33Y 50/02; B33Y 50/00; G06N 3/088; G06T 7/97; G06T 2207/20076; G06T 2207/20081; G06T 2207/20084;
(Continued)

(56) References Cited

U.S. PATENT DOCUMENTS 10,234,848 B2   3/2019 Mehr et al.
11,409,261 B2 *  8/2022 Kothari ................. B29C 64/393
(Continued)

FOREIGN PATENT DOCUMENTS

CA      3081678 A1    6/2019
DE   102017108534 A1   10/2018
(Continued)

OTHER PUBLICATIONS

Meng et al, "Machine Learning in Additive Manufacturing: A Review", JOM, vol. 72, No. 6, Apr. 17, 2020, pp. 2363-2377.
(Continued)

*Primary Examiner* — Bobbak Safaipour
(74) *Attorney, Agent, or Firm* — Dority & Manning, P.A.

(57) ABSTRACT

An additive manufacturing apparatus, a computing system, and a method for operating an additive manufacturing apparatus are provided. The method includes obtaining two or more images corresponding to respective build layers at a build plate, wherein each image comprises a plurality of data points comprising a feature and corresponding location at the build plate; removing variation between the features of the plurality of data points; and normalizing each feature to remove location dependence in the plurality of data points.

20 Claims, 3 Drawing Sheets

(51) Int. Cl.
*B29C 64/10* (2017.01)
*B33Y 10/00* (2015.01)
*B33Y 50/02* (2015.01)
*G06N 3/088* (2023.01)
*G06T 7/00* (2017.01)
*B29C 37/00* (2006.01)
*B29C 49/78* (2006.01)

(52) U.S. Cl.
CPC ............... *G06T 2207/20076* (2013.01); *G06T 2207/20081* (2013.01); *G06T 2207/20084* (2013.01)

(58) Field of Classification Search
CPC ...... G05B 2219/49018; G05B 19/4099; Y02P 10/25
See application file for complete search history.

(56) References Cited

U.S. PATENT DOCUMENTS

| | | |
|---|---|---|
| 2019/0283333 A1 | 9/2019 | Hwang et al. |
| 2019/0389137 A1 | 12/2019 | Frohnmaier et al. |
| 2020/0096970 A1 | 3/2020 | Mehr et al. |
| 2020/0189199 A1 | 6/2020 | Spears |
| 2020/0198010 A1 | 6/2020 | Edelhauser et al. |
| 2020/0242495 A1 | 7/2020 | Roychowdhury et al. |
| 2021/0362242 A1* | 11/2021 | Storck ...................... B22F 10/85 |
| 2022/0008997 A1* | 1/2022 | Goldammer ............. B22F 10/30 |
| 2022/0288691 A1* | 9/2022 | Hisaki ..................... B33Y 30/00 |
| 2022/0288696 A1* | 9/2022 | Hisaki ..................... B22F 10/85 |
| 2022/0324026 A1* | 10/2022 | Beckett ................... B33Y 50/02 |

FOREIGN PATENT DOCUMENTS

| | | |
|---|---|---|
| WO | WO2018/217903 A1 | 11/2018 |
| WO | WO2019/034394 A1 | 2/2019 |
| WO | WO2020/106725 A1 | 5/2020 |

OTHER PUBLICATIONS

Scime et al, "Layer-wise anomaly detection and classification for powder bed additive manufacturing processes: A machine-agnostic algorithm for real-time pixel-wise semantic segmentation", Additive Manufacturing, vol. 36, Dec. 1, 2020, p. 101453.

Scime et al, "Using machine learning to identify in-situ melt pool signatures indicative of flaw formation in a laser powder bed fusion additive manufacturing process", Additive Manufacturing, vol. 25, Jan. 1, 2019, pp. 151-165 (Abstract Only).

Yim et al, "A Framework for Self-Realizing Process Models for Additive Manufacturing", Proceedings of the ASME 2011 International Design Engineering Technical Conferences and Computers and Information in Engineering Conference, 2011, pp. 1099-1109 (Abstract Only).

* cited by examiner

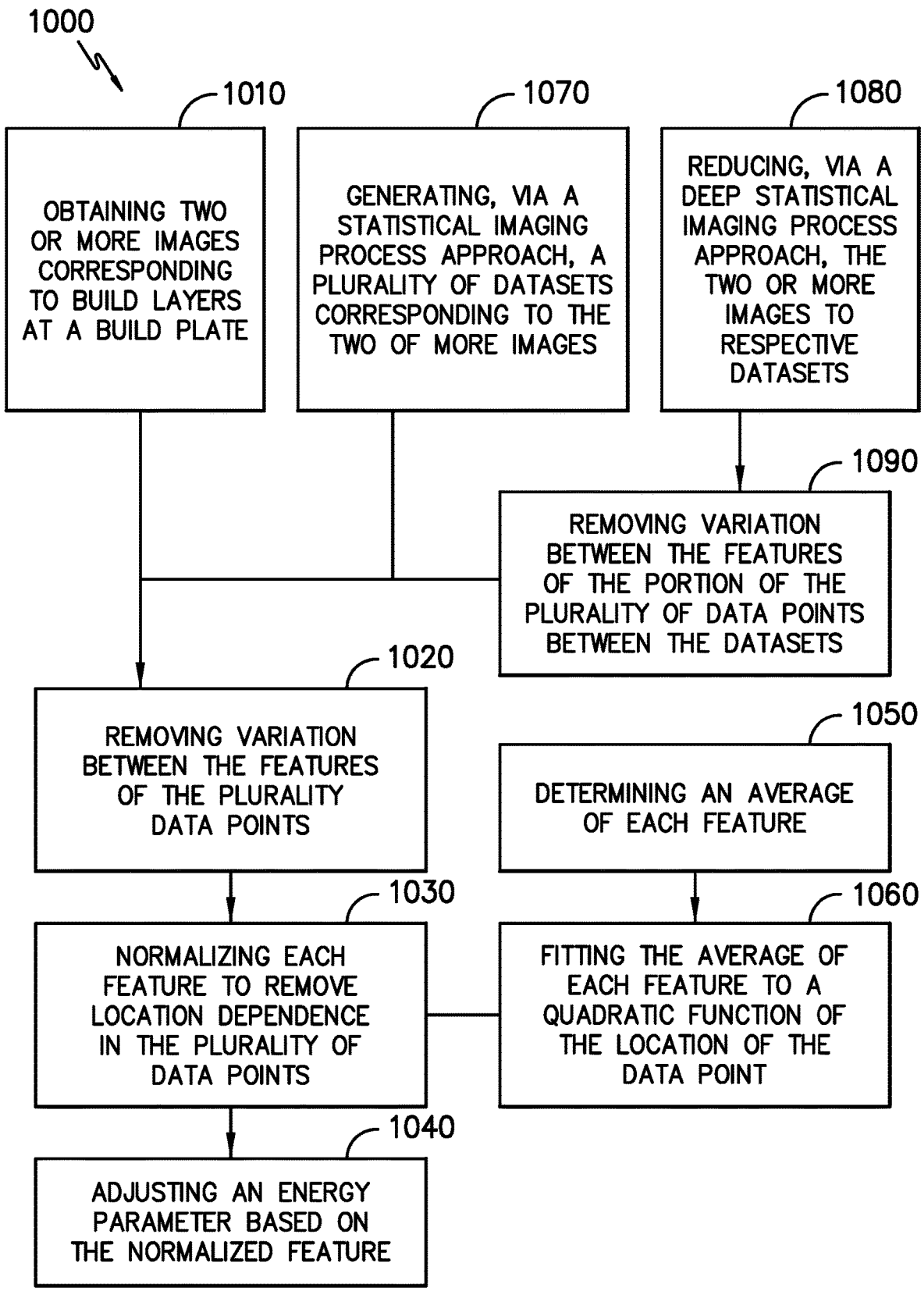
FIG. -1-

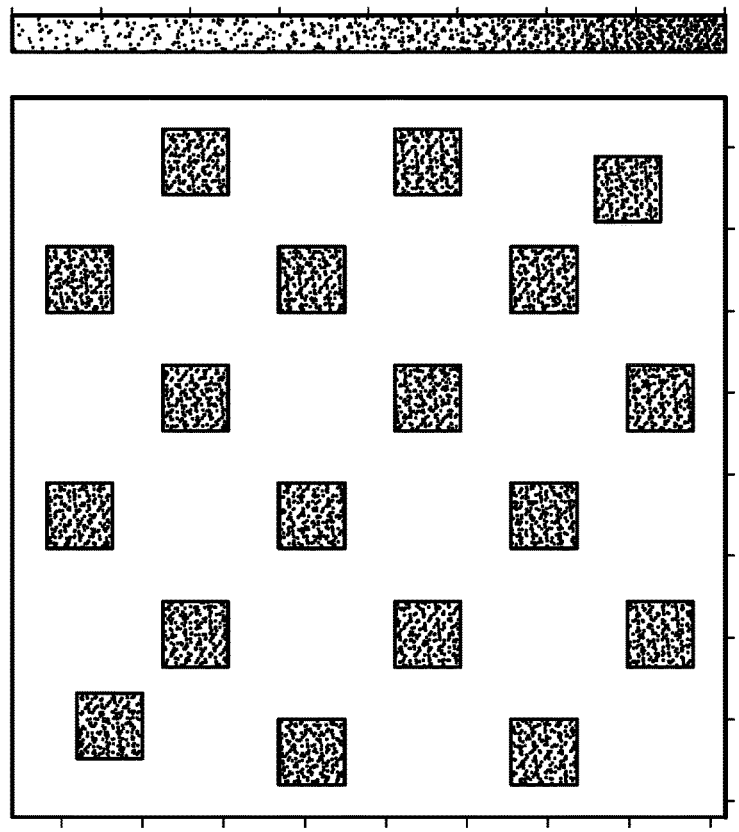
FIG. -3-
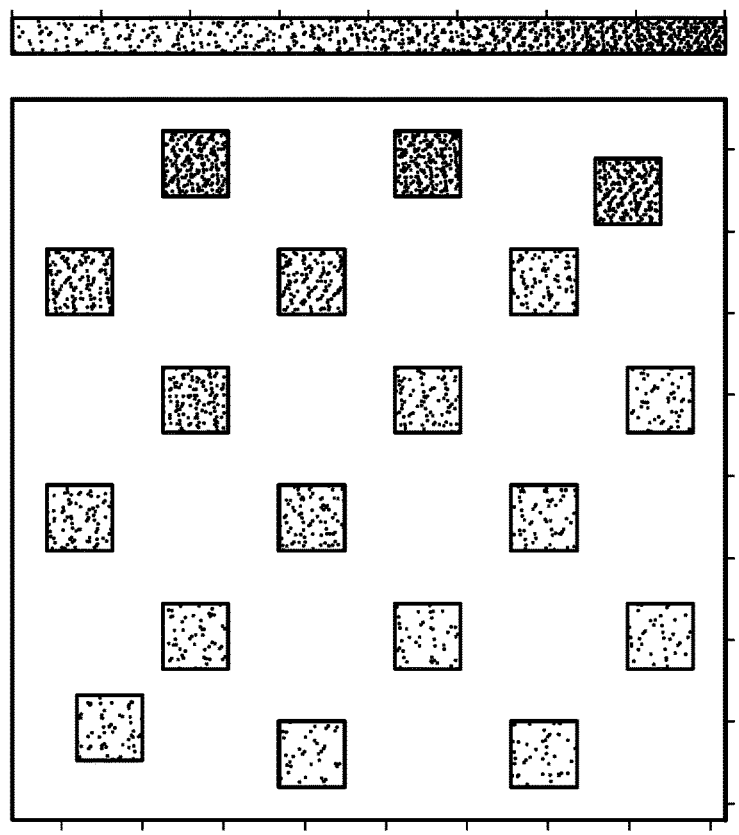
FIG. -2-

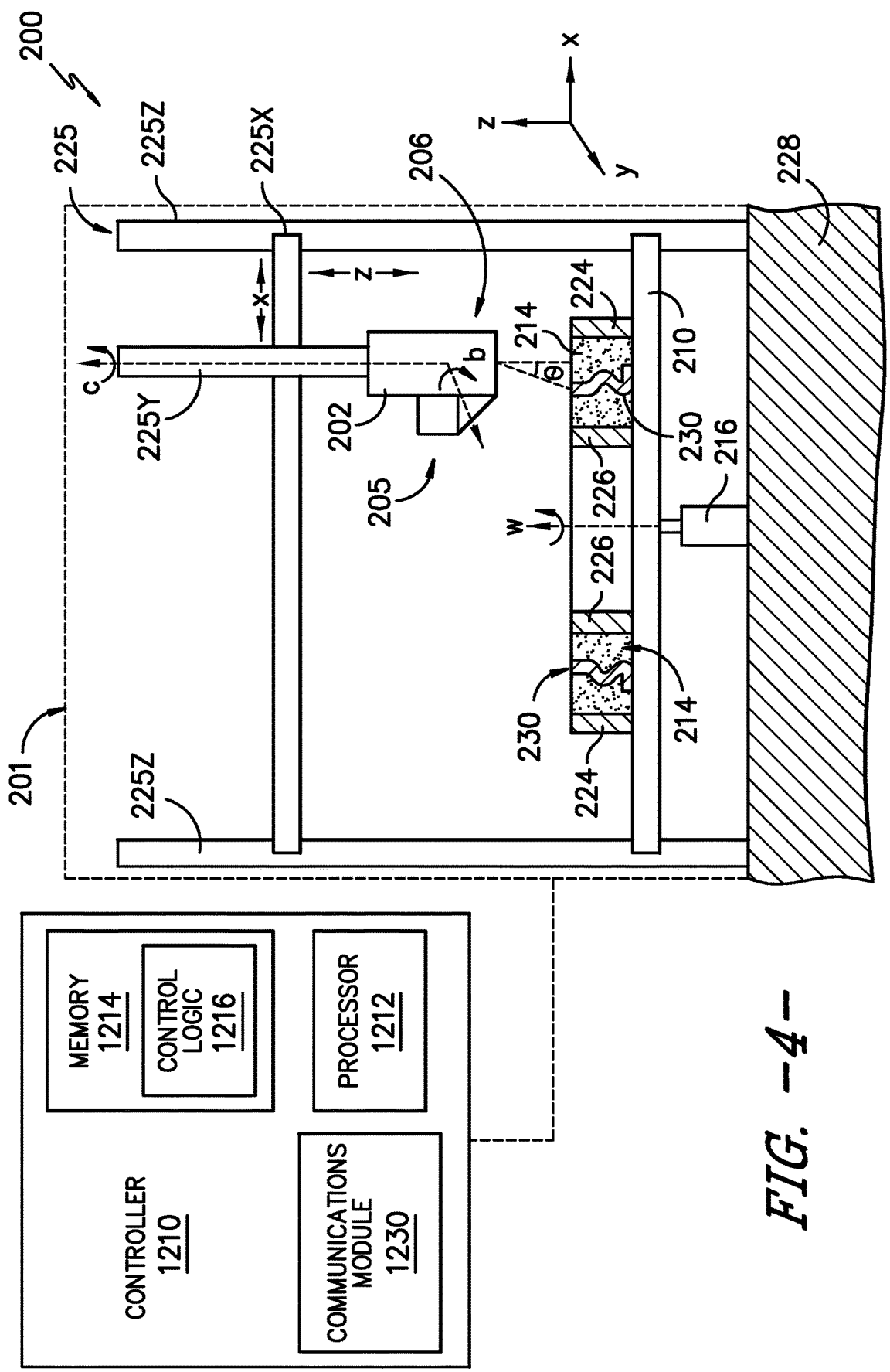
FIG. -4-

SYSTEM AND METHOD FOR ADDITIVE MANUFACTURING CONTROL

FIELD

The present subject matter relates generally to control systems and methods for control and operation for additive manufacturing apparatuses.

BACKGROUND

Additive manufacturing (AM) encompasses a variety of technologies for producing components in an additive, layer-wise fashion. In powder bed fusion, a focused energy beam is used to fuse powder particles together on a layer-wise basis. The energy beam may be either an electron beam or laser. Laser powder bed fusion processes are referred to in the industry by many different names, the most common of which being selective laser sintering (SLS) and selective laser melting (SLM), depending on the nature of the powder fusion process. When the powder to be fused is metal, the terms direct metal laser sintering (DMLS) and direct metal laser melting (DMLM) are commonly used.

AM machines generally include multiple sensors to monitor and control the build process. These sensors may exhibit significant variations across the build plate, which may limit the scope, use, or reliability of the data received from the sensors to control the build process. Multiple sensors may also generate data processing issues, such as due to the complexity of the data, the data file sizes, and the rate of increase in data generation. Such complexities may slow the build process or prevent timely changes to the build process that may mitigate errors that may be produced during the build process.

As such, there is a need for an additive manufacturing apparatus and method for operation that can mitigate or eliminate the generation of errors during the build process.

BRIEF DESCRIPTION

Aspects and advantages of the disclosure will be set forth in part in the following description, or may be obvious from the description, or may be learned through practice of the disclosure.

An additive manufacturing apparatus, a computing system, and a method for operating an additive manufacturing apparatus are provided. The method includes obtaining two or more images corresponding to respective build layers at a build plate, wherein each image comprises a plurality of data points comprising a feature and corresponding location at the build plate; removing variation between the features of the plurality of data points; and normalizing each feature to remove location dependence in the plurality of data points.

A computing system is provided herein, including one or more processors and one or more memory devices, wherein the one or more memory devices is configured to store instructions that, when executed by the one or more processors, causes the one or more processors to perform operations, the operations including steps of the method for operating an additive manufacturing apparatus.

An additive manufacturing apparatus is provided herein, including a build unit having an energy beam device configured to emit an irradiation beam, and an imaging device configured to obtain an image corresponding to a build layer at a build plate in accordance with the method for operating an additive manufacturing apparatus. The additive manufacturing apparatus includes a computing system configured to store or execute one or more steps of the method.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 1 is a flowchart outlining steps of a method for operating an additive manufacturing apparatus in accordance with aspects of the present disclosure;

FIG. 2 is an exemplary depiction of a raw feature space in accordance with an aspect of the present disclosure;

FIG. 3 is an exemplary depiction of a normalized feature space in accordance with an aspect of the present disclosure; and FIG. 4 is an exemplary embodiment of an additive manufacturing apparatus and computing system configured to execute one or more steps of the method for operation in accordance with an aspect of the present disclosure;

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of an additive manufacturing apparatus and method for operation that can mitigate or eliminate the generation of errors during the build process are provided. The computing systems, computer-implemented methods, and additive manufacturing apparatuses provided herein include steps and operations for capturing and obtaining build data via images from an imaging device, normalizing the data to remove location dependence of the build features, and operating the additive manufacturing apparatus, such as an energy beam device, based on the normalized features. The systems, methods, and apparatuses provided herein may mitigate or eliminate variations, defects, or other errors between the meltpools at the build layers, such as by adjusting the energy beam based on the normalized features. The methods provided herein may overcome issues associated with multiple sensors, large datasets, and large file sizes, such as by using images to capture the data points. The methods may further include reducing the image data via a machine learning algorithm to generate relatively smaller multi-dimensional datasets.

Embodiments are provided herein of an apparatus that may be used to perform powder-based additive layer manufacturing. Examples of powder-based additive layer manufacturing include, but are not limited to, selective laser sintering (SLS), selective laser melting (SLM), direct metal laser sintering (DMLS), direct metal laser melting (DMLM) and electron beam melting (EBM) processes. An additive manufacturing apparatus provided herein includes a build unit assembly. The build unit assembly includes certain build components, including, a powder recoating mechanism and an irradiation beam directing mechanism. In certain embodiments, the build unit is attached to a positioning mechanism that allows two- or three-dimensional movement (along x-, y- and z-axes) throughout the build environment, as well as rotation of the build unit in a way that allows leveling of the powder in any direction desired. The positioning mechanism may be a gantry, a delta robot, a cable robot, a robotic arm, a belt drive, or other appropriate positioning mechanism.

Various embodiments of the additive manufacturing apparatus may further include a moveable build platform, or any appropriate additive manufacturing machine where the scan head changes position relative to the build platform. For example, the build platform may include an X, Y, Z gantry system where the processing area moves about the build platform. However, it should be appreciated that the computing system and the computer-implemented methods described herein may be applied to any appropriate additive manufacturing apparatus, including those not depicted and described herein.

A computing system, such as controller 1210 further described below, is configured to control the build process. Computer-implemented methods provided herein allow for determining whether there is an error during the build process. Errors described herein include inconsistencies, gas pockets or bubbles, excessive or insufficient temperature or energy deposition, improper fusing, or other defects at one or more build layers during the build process. It should be appreciated that the computing system and the computer-implemented methods may determine whether there is an error during the build process for any appropriate additive manufacturing apparatus, including those not otherwise depicted or described herein. Thus, the systems and methods described herein may be utilized to identify and address defects in real-time during an additive manufacturing build.

Referring now to FIG. 1, a flowchart outlining steps of a method for operating an additive manufacturing apparatus is provided (hereinafter, "method 1000"). Embodiments of the method 1000 may be executed via an additive manufacturing apparatus 200 such as depicted and described in regard to FIG. 4, or any other suitable additive manufacturing system. Steps of the method 1000 may be stored as instructions that are executable via a controller 1210 further described in regard to FIG. 4, or any other suitable computing system, computing network, or computing device(s). The controller 1210 depicted and described with the additive manufacturing apparatus of FIG. 4, configured to execute steps of the method 1000, may be applied to any suitable additive manufacturing apparatus to determine errors during the build process, and are not restricted to the exemplary additive manufacturing apparatus of FIG. 4.

Steps of the method 1000 are outlined such as follows, and described in detail further below. It should be appreciated that steps of the method 1000 may be performed sequentially, in parallel, iteratively, or re-ordered. The method 1000 includes at 1010 obtaining, via an imaging device (e.g., imaging device 205 in FIG. 4), two or more images corresponding to build layers at a build plate. Each image includes a plurality of data points including a feature and corresponding location at the build plate. The method 1000 includes at 1020 removing variation between the features of the plurality of data points. The method 1000 includes at 1030 normalizing each feature to remove location dependence in the plurality of data points.

In certain embodiments, the method 1000 includes at 1040 adjusting, at an energy beam device (e.g., build unit 202 or energy beam device 206 in FIG. 4), an energy parameter based on the normalized feature. In particular embodiments, the method 1000 includes at 1050 determining an average of each feature, and at 1060 fitting the average of each feature to a quadratic function of the location of the data point.

In various embodiments, the method 1000 includes at 1070 generating, via a statistical imaging process approach, a plurality of datasets corresponding to the two or more images. The statistical imaging process approach includes mean, expectation, variance, asymmetry, standard deviation, entropy, total intensity, or any appropriate first-order statistical methods or second-order statistical methods, or appropriate machine learning algorithms, to generate one or more statistical features from images and corresponding image data of a meltpool, such as further described below. The statistical imaging process approach includes any appropriate method for generating a reduced representation of the respective images.

In a particular embodiment, the method 1000 at 1070 includes generating, via a machine learning algorithm, the plurality of datasets corresponding to the two or more images. The machine learning algorithm is configured to output the plurality of datasets as a reduced representation of the respective images. The method 1000 may include at 1080 reducing, via a statistical imaging process approach, the two or more images to respective datasets comprising a portion of the plurality of data points and at 1090 removing variation between the features of the portion of the plurality of data points between the datasets. In a particular embodiment, the method 1000 includes at 1080 reducing, via a machine learning algorithm, the two or more images to respective datasets comprising a portion of the plurality of data points and at 1090 removing variation between the features of the portion of the plurality of data points between the datasets, such as further described herein.

Embodiments of the method 1000 provided herein include obtaining images and corresponding image data of a meltpool via an imaging device. The meltpool includes a plurality of locations at which one or more energy beam devices emits an energy beam to the build layer to melt or fuse the material at the powder bed to form a layer of the build object.

The imaging device is any appropriate mechanism configured to capture data corresponding to the electromagnetic spectrum. The imaging device includes an optical device generally, or a camera or other sensor, configured to capture data corresponding to visible light, infrared rays, X-rays, ultraviolet light, or other appropriate frequency bands along the electromagnetic spectrum. In certain embodiments, the imaging device is attached to an irradiation beam directing mechanism, such that the imaging device may obtain images at various angles, depths, or perspectives that may alter the lighting, shadows, or perceptible areas of the meltpool between each obtained image or between each build layer. Such differences in angle, depth, or perspective corresponding to alterations in lighting, shadows, or perceptible areas of the meltpools define variations between the obtained images.

Embodiments of the method provided herein account for such variations in the obtained image via normalization, such as to generate a more uniform dataset from the images of features across the build platform. In certain embodiments, the images include a plurality of high volume and high dimensional data points. Certain embodiments of the system and method may utilize the images to generate normalization coefficients such as further described below.

In some embodiments, the system and method may utilize a machine learning algorithm to generate a multi-dimensional feature space or dataset from the image. In various embodiments, the machine learning algorithm is a deep learning algorithm. More particularly, the deep learning algorithm is a neural network configured to generate the feature space using, as an input, the image corresponding to the build layer. In a still particular embodiment, the neural network is an autoencoder. The autoencoder is configured to learn a representation of the image and output a multi-dimensional dataset corresponding to the image. The autoencoder performs a dimension reduction of the image and retains in the dataset the intrinsic dimensions corresponding to the image. Accordingly, the dataset is a lower dimension representation of the image obtained from the imaging device.

In a particular exemplary embodiment, the image is a 100×100 pixel plurality of data points. The plurality of data points includes information indicative of the features at the build layer and the location (e.g., Cartesian coordinates, such as x-y location, or polar coordinates, or other appropriate system indicative of coordinate space) of the respective features at the build layer. In a particular exemplary embodiment, the dataset output by the machine learning algorithm is a 16-dimension feature space. In a still particular embodiment, the autoencoder outputs the 16-dimension feature space including the intrinsic dimensions corresponding to the features and locations of the input image.

Embodiments of the system and method provided herein include normalizing each feature to remove location dependence. A multi-data point or multi-pin build is performed during which the imaging device obtains an image across two or more build layers. Each pin corresponds to a particular location at the build layer having features that may be compared across various build layers. In a particular embodiment, normalization includes utilizing the images obtained across two or more build layers. In another embodiment, normalization includes utilizing the features spaces or datasets reduced from the images via the machine learning algorithm.

For each pin, an average of each feature is fit into a function (such as a quadratic function) of the location of the pin. The average and fit capture variations of each feature at the respective location of the build platform. An exemplary function is provided as follows:

$$\langle f \rangle = a_0 + a_1 x + a_2 y + a_3 x^2 + a_4 y^2 + a_5 xy$$

The average of each feature f is represented by <f>, the location is represented by x and y; and the normalization coefficients are represented by $a_0, a_1, a_2, \ldots a_n$. The raw or input features (e.g., depicted in FIG. 2) are normalized by an estimated fit to remove the location (e.g., x,y) dependence:

$$\hat{f} = \frac{f}{\langle f \rangle}$$

The normalized features $\hat{f}$ (e.g., depicted in FIG. 3) provide an improved classification accuracy in contrast to the raw or input features f from the image obtained by the imaging device. The normalized features allow for adjusting, altering, modulating, or otherwise changing one or more energy parameters at the irradiation beam directing mechanism, or particularly at the energy beam device, based on the normalized features. In a particular embodiment, normalized features allow for adjusting, altering, modulating, or otherwise changing one or more energy parameters at the irradiation beam directing mechanism, or particularly at the energy beam device, based on the normalized features rather than variations in the obtained images, such as, e.g., angle, depth, or perspective of the obtained image. In various embodiments, the energy parameter includes one or more of a wavelength, output power, spot size or diameter, or pulse width of the energy beam received or deposited onto the build layer. In still various embodiments, the energy parameter may include an angle or other geometry of the energy beam emitted from the energy beam device relative to the build layer. In certain embodiments, the normalized features allow for changing the energy parameter relative to each pin, each feature, or each build layer, such as to mitigate or eliminate the occurrence of errors during the build process. In another embodiment, the normalized features allow for changing the energy parameter following an initial build, such as to improve the build process and mitigate or eliminate errors from forming during subsequent builds.

FIG. 4 depicts a schematic representation of an additive manufacturing apparatus 200 of an embodiment of the present disclosure. The additive manufacturing apparatus 200 may include a build enclosure 201 housing the additive manufacturing apparatus 200 and object 230 to be built. The additive manufacturing apparatus 200 includes a build unit 202 and a build platform 210. During operation, the apparatus builds an object 230 in a powder bed 214 formed between one or both of an outer grown build envelope 224 or an inner build envelope 226.

The build unit 202 may be configured to include several components for additively manufacturing a high-precision, large-scale object or multiple smaller objects. The build unit 202 may be provided in the form of modular containers configured to be installed into and removed from the additive manufacturing apparatus 200. Additionally, or alternatively, the build unit 202 may define a fixed componentry of the additive manufacturing apparatus 200. The build unit 202 may be a mobile build unit including a powder delivery mechanism, a powder recoating mechanism, a gas-flow mechanism with a gas-flow zone, an irradiation beam directing mechanism, an energy beam device 206, and an imaging device 205. The powder delivery mechanism contains a supply of powder material housed within a supply chamber. In an exemplary embodiment, the powder delivery mechanism may elevate a powder floor during operation of the additive manufacturing apparatus 200 to force out a portion of the powder material. The powder recoating mechanism may define a blade or roller to distribute layers of the powder material across the build platform 210.

The build unit positioning mechanism 225 may be an X-Y-Z gantry that has one or more x-crossbeams 225X (one shown in FIG. 4) that independently move the build unit 202 along the x-axis (i.e., left or right), one or more y-crossbeams 225Y (one shown in FIG. 4) that respectively move the build unit 202 along the y-axis (i.e., inward or outward). Such two-dimensional movements across the x-y plane are substantially parallel to the build platform 210 or a build area therewithin. Additionally, the build unit positioning mechanism 225 has one or more z-crossbeams 225Z (two shown in FIG. 4) that moves the build unit 202 along the z-axis (i.e., upward and downward or substantially perpendicular to the build platform 210 or a build area therewithin). In an exemplary embodiment, the build unit positioning mechanism 225 is operable to rotate the build unit 202 around the c-axis and also the b-axis. The build unit positioning mechanism 225 may also be a robotic arm (not shown) or other suitable mechanism as desired.

The energy beam device 206 is configured to generate one or more of energy beams, such as laser beams, and to direct the respective energy beams onto the build platform 210 to selectively solidify respective portions of the powder bed defining a build plane. As the respective energy beams selectively melt or fuse the sequential layers of powder material that define the powder bed, the object 230 begins to take shape. The one or more energy beams or laser beams may include electromagnetic radiation having any suitable wavelength or wavelength range, such as a wavelength or wavelength range corresponding to infrared light, visible light, and/or ultraviolet light.

Typically, with a DMLM, EBM, or SLM system, the powder material is fully melted, with respective layers being melted or re-melted with respective passes of the energy beams. With DMLS or SLS systems, typically the layers of powder material are sintered, fusing particles of powder material to one another generally without reaching the melting point of the powder material. The energy beam device 206 may include componentry integrated as part of the additive manufacturing apparatus 200 and/or componentry that is provided separately from the additive manufacturing apparatus 200.

The energy beam device 206 may include one or more irradiation devices configured to generate a plurality of energy beams and to direct the energy beams upon the build platform 210. The irradiation devices may respectively have an energy beam source, a galvo-scanner, and optical assembly that includes a plurality of optical elements configured to direct the energy beam onto the build platform 210. The optical assembly may include one or more optical elements, such as lenses through which an energy beam may be transmitted along an optical path from the energy beam source to the build plane. By way of example, an optical assembly may include one more focusing lenses that focus an energy beam on a build platform 210. Additionally, or in the alternative, an optical assembly may include a window, such as a protective glass, that separates one or more components of the energy beam device 206 from a process chamber within which powder material is irradiated by one or more energy beams to additively manufacture a three-dimensional object 230. The window or protective glass may include one or more optical elements, such as lenses or panes, through which an energy beam passes along an optical path to the build platform 210. The window or protective glass may separate the one or more components of the energy beam system from conditions existing within the process chamber of an additive manufacturing apparatus 200. Such window or protective glass may prevent contaminants associated with the additive manufacturing process, such as powder material, dust, soot, residues from fumes or vapor, and the like, from coming into contact with sensitive components of an energy beam device 206. Accumulation of contaminants upon various optical elements of an optical assembly may adversely affect operation of the energy beam device 206 and/or quality metrics associated with an energy beam system. Additionally, or in the alternative, such contaminants may cause damage to various optical elements of an optical assembly.

In an exemplary embodiment, the build platform 210 may be a rigid, ring-shaped or annular structure (i.e., with an inner central hole) configured to rotate 360° around the center of rotation W, or the build platform may be a disk without a central hole. The build platform 210 may be secured to an end mount of a motor 216 that is operable to selectively rotate the rotating build platform 210 around the center of rotation W such that the build platform 210 moves in a circular path. The motor 216 may be further secured to a stationary support structure 228. The motor may also be located elsewhere near the apparatus and mechanically connected with the build platform via a belt for translating motion of the motor to the build platform. Alternatively, the build platform 210 may be a rectangular or other structure, fixed or configured to translate via the motor 216 to selectively move the build platform 210 relative to the process area. Additionally, or alternatively, the energy beam device 206, the build unit positioning mechanism 225, and/or the build platform 210 may be configured in any appropriate manner to translate the object 230 relative to one or more of the energy beam device 206, the build platform 210, or other components of the additive manufacturing apparatus 200.

It will be appreciated that an additive manufacturing apparatus may or may not utilize a powder module and/or an overflow module, and that other systems may be provided for handling the powder material, including different powder supply systems and/or excess powder recapture systems. The subject matter of the present disclosure may be practiced with any suitable additive manufacturing machine without departing from the scope hereof.

Still referring to FIG. 4, the additive manufacturing apparatus 200 the imaging device 205 may be configured to monitor one or more operating parameters of the additive manufacturing apparatus 200, one or more parameters of an energy beam device 206, and/or one or more operating parameters of an additive manufacturing process. The imaging device 205 may include a calibration system configured to calibrate one or more operating parameters of an additive manufacturing apparatus 200 and/or of an additive manufacturing process. The imaging device 205 may be a meltpool monitoring system. The one or more operating parameters of the additive manufacturing process may include operating parameters associated with additively manufacturing a three-dimensional object 230. The imaging device 205 may be configured to detect an imaging beam such as an infrared beam from a laser diode and/or a reflected portion of the energy beam.

The energy beam device 206 and/or the imaging device 205 may include one or more detection devices. The one or more detection devices may be configured to determine one or more parameters of the energy beam device 206, such as one or more parameters associated with irradiating the sequential layers of the powder bed based at least in part on an assessment beam detected by the imaging device 205. One or more parameters associated with irradiating the sequential layers of the powder bed may include irradiation parameters and/or object parameters, such as meltpool monitoring parameters. The one or more parameters determined by the imaging device 205 may be utilized, for example, by a controller 1210, to control one or more operations of the additive manufacturing apparatus 200, such as described herein with regard to the method 1000. The one or more detection devices may be configured to obtain assessment data of the build platform 210 from a respective assessment beam. An exemplary detection device may include a camera, an image sensor, a photo diode assembly, or the like. For example, a detection device may include charge-coupled device (e.g., a CCD sensor), an active-pixel sensor (e.g., a CMOS sensor), a quanta image device (e.g., a QIS sensor), or the like. A detection device may additionally include a lens assembly configured to focus an assessment beam along a beam path to the detection device. The imaging device 205 may include one or more imaging optical elements (not shown), such as mirrors, beam splitters, lenses, and the like, configured to direct an assessment beam to a corresponding detection device.

Referring to FIG. 4, the additive manufacturing apparatus 200 may further include a controller 1210 configured to execute steps of the method 1000 such as described above. In various embodiments, the controller 1210 can generally correspond to any suitable processor-based device, including one or more computing devices. For instance, FIG. 4 illustrates one embodiment of suitable components that can be included within the controller 1210. As shown in FIG. 4, the controller 1210 may include a processor 1212 and associated memory 1214 configured to perform a variety of computer-implemented functions. In various embodiments, the controller 1210 is configured to operate the additive manufacturing apparatus 200 such as depicted and described herein.

As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 1214 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD), non-transitory computer-readable media, and/or other suitable memory elements or combinations thereof.

As shown, the controller 1210 may include control logic 1216 stored in memory 1214. The control logic 1216 may include computer-readable instructions that when executed by the one or more processors 1212 cause the one or more processors 1212 to perform operations, such as steps of the method for control outlined, depicted, and described herein. In still various embodiments, the memory 1214 may store charts, tables, functions, look ups, etc. corresponding to the energy parameters, image data, datasets, data points, etc. The instructions can be software written in any suitable programming language or can be implemented in hardware. Additionally, and/or alternatively, the instructions can be executed in logically and/or virtually separate threads on processor(s). The memory device(s) can further store data that can be accessed by the processor(s). The data may include the images, datasets, data points, features, location data, or other information such as described herein.

Additionally, as shown in FIG. 4, the controller 1210 may also include a communications interface module 1230. In various embodiments, the communications interface module 1230 can include associated electronic circuitry that is used to send and receive data. As such, the communications interface module 1230 of the controller 1210 can be used to receive data from one or more sensors, modules, subsystems, or devices at the additive manufacturing apparatus 200, such as, but not limited to, the build unit, the irradiation beam directing mechanism, the imaging system, or the energy beam device, or calculations or measurements corresponding thereto. As described above, the communications interface module may communicate a commanded or demanded energy parameter, or receive a present energy parameter indicative of a present operating state of the energy beam device. It should be appreciated that calculations or measurements corresponding thereto may include, but are not limited to, temperatures, wavelengths, beam diameters, pulse widths, scan times, deposition times, beam exposure times, or other energy beam properties. In addition, the communications interface module 1230 can also be used to communicate with any other suitable components of the additive manufacturing apparatus 200, such as to receive data or send commands to/from the build unit 202, the irradiation beam directing mechanism, the energy beam device, the imaging device, the build platform 210, the powder bed 214, the build unit positioning mechanism 225, one or more motors 216, or other controllable portions of the additive manufacturing apparatuses 200.

The computing device(s) can also include a network interface used to communicate, for example, with the other components of system or apparatus. The network interface can include any suitable components for interfacing with one or more network(s), including for example, transmitters, receivers, ports, controllers, antennas, and/or other suitable components.

It should be appreciated that the communications interface module 1230 can be any combination of suitable wired and/or wireless communications interfaces and, thus, can be communicatively coupled to one or more components of the apparatus via a wired and/or wireless connection. As such, the controller 1210 may obtain, determine, store, generate, transmit, or operate any one or more steps of the method for control and operation described herein via a distributed network. For instance, the network can include a SATCOM network, ACARS network, ARINC network, SITA network, AVICOM network, a VHF network, a HF network, a Wi-Fi network, a WiMAX network, a gatelink network, etc.

Representative examples of suitable powder materials for embodiments of the apparatus depicted and described herein may include metallic alloy, polymer, or ceramic powders. Exemplary metallic powder materials are stainless steel alloys, cobalt-chrome, aluminum alloys, titanium alloys, nickel based superalloys, and cobalt based superalloys. In addition, suitable alloys may include those that have been engineered to have good oxidation resistance, known "superalloys" which have acceptable strength at the elevated temperatures of operation in a gas turbine engine, e.g. Hastelloy, Inconel alloys (e.g., IN 738, IN 792, IN 939), Rene alloys (e.g., Rene N4, Rene N5, Rene 80, Rene 142, Rene 195), Haynes alloys, Mar M, CM 247, CM 247 LC, C263, 718, X-850, ECY 768, 282, X45, PWA 1483 and CMSX (e.g. CMSX-4) single crystal alloys. The manufactured objects of the present disclosure may be formed with one or more selected crystalline microstructures, such as directionally solidified ("DS") or single-crystal ("SX").

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing. It should further be appreciated that, although exemplary embodiments of an additive manufacturing apparatus are provided herein, the method 1000 and controller 1210 configured to execute steps of the method 1000 may be utilized and applied to any appropriate additive manufacturing apparatus including an energy beam device and an imaging device.

This written description uses examples to disclose the embodiments described herein, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the disclosure are provided by the subject matter of the following clauses:

1. A computing system for an additive manufacturing apparatus, the computing system including one or more processors and one or more memory devices, wherein the one or more memory devices is configured to store instructions that, when executed by the one or more processors, causes the one or more processors to perform operations, the operations comprising: obtaining two or more images corresponding to respective build layers at a build plate, wherein each image comprises a plurality of data points comprising a feature and corresponding location at the build plate; removing variation between the features of the plurality of data points; and normalizing each feature to remove location dependence in the plurality of data points.

2. The computing system of any preceding clause, the operations comprising: adjusting an energy parameter based on the normalized feature.

3. The computing system of any preceding clause, wherein the energy parameter comprises one or more of a wavelength, power, spot size, or pulse width of an energy beam.

4. The computing system of any preceding clause, wherein removing variation between the features comprises determining an average of each feature.

5. The computing system of any preceding clause, wherein removing variation between the features comprises fitting the average of each feature to a quadratic function of the location of the plurality of data points.

6. The computing system of any preceding clause, the operations comprising: reducing the two or more images to respective datasets comprising a portion of the plurality of data points.

7. The computing system of any preceding clause, the operations comprising: generating, via a machine learning algorithm, a plurality of datasets corresponding to the two or more images.

8. The computing system of any preceding clause, wherein the plurality of datasets comprise a portion of the plurality of data points.

9. The computing system of any preceding clause, wherein the machine learning algorithm is a neural network.

10. The computing system of any preceding clause, wherein the machine learning algorithm is an autoencoder configured to output the plurality of datasets as a reduced representation of the respective images.

11. A computer-implemented method for operating an additive manufacturing apparatus, the method comprising: directing, by a computing system, an imaging device to obtain two or more images corresponding to build layers at a build plate, wherein each image comprises a plurality of data points comprising a feature and corresponding location at the build plate; removing, via the computing system, variation between the features of the plurality of data points; and normalizing, via the computing system, each feature to remove location dependence in the plurality of data points.

12. The computer-implemented method of any preceding clause, the method comprising: adjusting, via the computer system, an energy parameter at an energy beam device based on the normalized feature.

13. The computer-implemented method of any preceding clause, the method comprising: determining, via the computing system, an average of each feature; and fitting the average of each feature to a quadratic function of the location of the data point.

14. The computer-implemented method of any preceding clause, the method comprising: generating, via a machine learning algorithm, a plurality of datasets corresponding to the two or more images, wherein the machine learning algorithm is configured to output the plurality of datasets as a reduced representation of the respective images.

15. The computer-implemented method of any preceding clause, the method comprising: reducing, via a machine learning algorithm, the two or more images to respective datasets comprising a portion of the plurality of data points; and removing, via the computing system, variation between the features of the portion of the plurality of data points between the datasets.

16. An additive manufacturing apparatus, the apparatus comprising: a build unit comprising an energy beam device configured to emit an irradiation beam and an imaging device configured to obtain an image corresponding to a build layer at a build plate; and a computing system comprising one or more processors and one or more memory devices, wherein the one or more memory devices is configured to store instructions that, when executed by the one or more processors, causes the one or more processors to perform operations, the operations comprising: obtaining two or more images from the imaging device corresponding to build layers at the build plate, wherein each image comprises a plurality of data points comprising a feature and a corresponding location at the build plate; removing variation between the features of the plurality of data points; and normalizing each feature to remove location dependence in the plurality of data points.

17. The additive manufacturing apparatus of any preceding clause, the operations comprising: adjusting an energy parameter at the energy beam device based on the normalized feature.

18. The additive manufacturing apparatus of any preceding clause, the operations comprising: determining an average of each feature; and fitting the average of each feature to a quadratic function of the location of the data point.

19. The additive manufacturing apparatus of any preceding clause, the operations comprising: generating, via a machine learning algorithm, a plurality of datasets corresponding to the two or more images, wherein the machine learning algorithm is configured to output the plurality of datasets as a reduced representation of the respective images.

20. The additive manufacturing apparatus of any preceding clause, the operations comprising: reducing, via a machine learning algorithm, the two or more images to respective datasets comprising a portion of the plurality of data points; and removing variation between the features of the portion of the plurality of data points between the datasets.

What is claimed is:

1. A computing system for an additive manufacturing apparatus, the computing system including one or more processors and one or more memory devices, wherein the one or more memory devices is configured to store instructions that, when executed by the one or more processors, causes the one or more processors to perform operations, the operations comprising:
    obtaining two or more images corresponding to respective build layers at a build plate, wherein each image comprises a plurality of data points comprising a feature and corresponding location at the build plate;
    removing variation between the features of the plurality of data points;
    normalizing each feature to remove location dependence in the plurality of data points; and
    operating the additive manufacturing apparatus based on the normalized features.

2. The computing system of claim 1, the operations comprising:
    adjusting an energy parameter based on the normalized feature.

3. The computing system of claim 2, wherein the energy parameter comprises one or more of a wavelength, power, spot size, or pulse width of an energy beam.

4. The computing system of claim 1, wherein removing variation between the features comprises determining an average of each feature.

5. The computing system of claim 4, wherein removing variation between the features comprises fitting the average of each feature to a quadratic function of the location of the plurality of data points.

6. The computing system of claim 1, the operations comprising:
    reducing the two or more images to respective datasets comprising a portion of the plurality of data points.

7. The computing system of claim 1, the operations comprising:
    generating, via a machine learning algorithm, a plurality of datasets corresponding to the two or more images.

8. The computing system of claim 7, wherein the plurality of datasets comprise a portion of the plurality of data points.

9. The computing system of claim 7, wherein the machine learning algorithm is a neural network.

10. The computing system of claim 9, wherein the machine learning algorithm is an autoencoder configured to output the plurality of datasets as a reduced representation of the respective images.

11. A computer-implemented method for operating an additive manufacturing apparatus, the method comprising:
    directing, by a computing system, an imaging device to obtain two or more images corresponding to build layers at a build plate, wherein each image comprises a plurality of data points comprising a feature and corresponding location at the build plate;
    removing, via the computing system, variation between the features of the plurality of data points;
    normalizing, via the computing system, each feature to remove location dependence in the plurality of data points; and
    operating the additive manufacturing apparatus based on the normalized features.

12. The computer-implemented method of claim 11, the method comprising:
    adjusting, via the computer system, an energy parameter at an energy beam device based on the normalized feature.

13. The computer-implemented method of claim 11, the method comprising:
    determining, via the computing system, an average of each feature; and
    fitting the average of each feature to a quadratic function of the location of the data point.

14. The computer-implemented method of claim 11, the method comprising:
    generating, via a machine learning algorithm, a plurality of datasets corresponding to the two or more images, wherein the machine learning algorithm is configured to output the plurality of datasets as a reduced representation of the respective images.

15. The computer-implemented method of claim 11, the method comprising:
    reducing, via a machine learning algorithm, the two or more images to respective datasets comprising a portion of the plurality of data points; and
    removing, via the computing system, variation between the features of the portion of the plurality of data points between the datasets.

16. An additive manufacturing apparatus, the apparatus comprising:
    a build unit comprising an energy beam device configured to emit an irradiation beam and an imaging device configured to obtain an image corresponding to a build layer irradiated by the irradiation beam at a build plate; and
    a computing system comprising one or more processors and one or more memory devices, wherein the one or more memory devices is configured to store instructions that, when executed by the one or more processors, causes the one or more processors to perform operations, the operations comprising:
        obtaining two or more images from the imaging device corresponding to build layers at the build plate, wherein each image comprises a plurality of data points comprising a feature and a corresponding location at the build plate;
        removing variation between the features of the plurality of data points; and
        normalizing each feature to remove location dependence in the plurality of data points.

17. The additive manufacturing apparatus of claim 16, the operations comprising:
    adjusting an energy parameter at the energy beam device based on the normalized feature.

18. The additive manufacturing apparatus of claim 16, the operations comprising:
- determining an average of each feature; and
- fitting the average of each feature to a quadratic function of the location of the data point.

19. The additive manufacturing apparatus of claim 16, the operations comprising:
- generating, via a machine learning algorithm, a plurality of datasets corresponding to the two or more images, wherein the machine learning algorithm is configured to output the plurality of datasets as a reduced representation of the respective images.

20. The additive manufacturing apparatus of claim 16, the operations comprising:
- reducing, via a machine learning algorithm, the two or more images to respective datasets comprising a portion of the plurality of data points; and
- removing variation between the features of the portion of the plurality of data points between the datasets.

\* \* \* \* \*